(12) United States Patent
Jakobsson et al.

(10) Patent No.: US 10,486,972 B2
(45) Date of Patent: Nov. 26, 2019

(54) PROCESS FOR SAFE PRODUCTION OF PHOSGENE

(71) Applicant: Haldor Topsøe A/S, Kgs. Lyngby (DK)

(72) Inventors: Niklas Bengt Jakobsson, Kågeröd (SE); Berit Hinnemann, Stenløse (DK); Claus Friis Pedersen, Vanløse (DK); Niels Christian Schjødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 48 days.

(21) Appl. No.: 15/316,405

(22) PCT Filed: Jun. 1, 2015

(86) PCT No.: PCT/EP2015/062149
§ 371 (c)(1),
(2) Date: Dec. 5, 2016

(87) PCT Pub. No.: WO2015/189064
PCT Pub. Date: Dec. 17, 2015

(65) Prior Publication Data
US 2018/0194632 A1    Jul. 12, 2018

(30) Foreign Application Priority Data
Jun. 11, 2014    (EP) .................................... 14171871

(51) Int. Cl.
*C01B 32/80* (2017.01)
*C25B 1/00* (2006.01)
*C25B 9/18* (2006.01)
*C25B 15/08* (2006.01)

(52) U.S. Cl.
CPC ............... *C01B 32/80* (2017.08); *C25B 1/00* (2013.01); *C25B 9/18* (2013.01); *C25B 15/08* (2013.01)

(58) Field of Classification Search
CPC .. C01B 32/80; C25B 9/18; C25B 1/00; C25B 15/08
See application file for complete search history.

(56) References Cited

U.S. PATENT DOCUMENTS

| | | | | |
|---|---|---|---|---|
| 1,457,493 A | * | 6/1923 | Bradner | .................. C01B 32/00 562/847 |
| 3,855,104 A | * | 12/1974 | Messner | .................. C25B 1/26 204/256 |
| 4,073,806 A | | 2/1978 | Doubovetzky et al. | |
| 4,764,308 A | | 8/1988 | Sauer et al. | |
| 6,022,993 A | | 2/2000 | Cicha et al. | |
| 6,054,107 A | | 4/2000 | Cicha et al. | |
| 6,402,930 B1 | * | 6/2002 | Allen | ...................... C25B 1/26 205/618 |
| 6,602,478 B2 | * | 8/2003 | Brundage | ........... H01M 8/0662 422/627 |
| 7,442,835 B2 | | 10/2008 | Keggenhoff et al. | |
| 8,492,587 B2 | | 7/2013 | Olbert et al. | |
| 8,821,829 B2 | | 9/2014 | Olbert et al. | |
| 9,486,771 B2 | | 11/2016 | Lane et al. | |
| 2013/0072717 A1 | | 3/2013 | Olbert et al. | |

FOREIGN PATENT DOCUMENTS

| | | |
|---|---|---|
| CN | 1209109 A | 2/1999 |
| CN | 102834163 A | 12/2012 |
| CN | 103570018 A | 2/2014 |
| DE | 199 16 856 A1 | 9/1999 |
| JP | 10-120410 A | 5/1998 |
| JP | 2000-513692 A | 10/2000 |
| JP | 2005-525986 A | 9/2005 |
| JP | 2006-62957 A | 3/2006 |
| JP | 2012-512124 A | 5/2012 |
| WO | WO 98/28227 A1 | 7/1998 |
| WO | WO 2005/054128 A2 | 6/2005 |
| WO | WO 2013/131778 A2 | 9/2013 |

OTHER PUBLICATIONS

Wei et al, International Journal of Electrochemical Science, Evaluation on the Efficiency of a Solar Powered Solid Oxide Electrolysis Cell Plant for Carbon Dioxide Reduction, 2014, 9, pp. 1146-1162. (Year: 2014).*

Minh et al, The Electrochemical Society, Interface, Reversible Solid Oxide Fuel Cell Technology for Green Fuel and Power Production, Winter 2013, pp. 55-62. (Year: 2013).*

Zhan et al, Energy & Fuels, Syngas Production by Coelectrolysis of CO2/H20: The Basis for a Renewable Energy Cycle, 2009 , 23 , pp. 3089-3096. (Year: 2009).*

S. Ebbesen et al., "Electrolysis of Carbon Dioxide in Solid Oxide Electrolysis Cells", Journal of Power Sources, vol. 193, Mar. 19, 2009, pp. 349-358.

* cited by examiner

*Primary Examiner* — Paul A Zucker
(74) *Attorney, Agent, or Firm* — Blank Rome LLP

(57) ABSTRACT

In a process for safe production of phosgene ($COCl_2$) from carbon monoxide and chlorine according to the reaction scheme CO (g)+$Cl_2$ (g)−>$COCl_2$ (g) in a plant with a capacity of phosgene below 10 t/hr, the CO is produced on site from a feed stock based mainly on $CO_2$. The plant preferably comprises a solid oxide electrolysis cell (SOEC) stack system producing CO for use together with chlorine in the phosgene synthesis. This way of producing phosgene is based on using primary raw materials for which escape concentrations above 1000 ppm or even above 10000 ppm or 10% will not result in any health risk.

5 Claims, 1 Drawing Sheet

PROCESS FOR SAFE PRODUCTION OF PHOSGENE

The present invention relates to a process for safe production of phosgene. More specifically it relates to a process for the production of phosgene in a smaller plant, i.e. a plant with a nameplate capacity below 10 tons per hour, preferably below 1 ton per hour, from carbon monoxide and chlorine according to the reaction scheme $$CO(g)+Cl_2(g)\to COCl_2(g) \qquad (1)$$

where the gaseous reactants CO and $Cl_2$ are produced on site from raw materials much less hazardous than $COCl_2$, CO and $Cl_2$.

Phosgene (carbonyl dichloride) is a colourless poisonous gas with the formula $COCl_2$. It is an important chemical in the preparation of intermediates and end products in virtually all branches of chemistry. It is used as an industrial reagent and building block in the synthesis of a large number of pharmaceuticals and other organic compounds. The largest field of application in terms of quantity is the preparation of diisocyanates for polyurethane chemistry, in particular toluene diisocyanate and 4,4'-methylene diphenyl diisocyanate. Thus, in the USA around 80 percent of the total production of phosgene is used for the preparation of various isocyanate products, which in turn are used for the production of polyurethane resins and various pesticides. Around 10 percent of the phosgene production is used for the production of polycarbonates, while the rest is used to produce organic carbonate compounds and acid chlorides.

Industrially, phosgene is produced by passing purified carbon monoxide and chlorine gas through a bed of porous activated charcoal which serves as a catalyst. The reaction is shown in equation (1) above.

This basic manufacturing process for phosgene has not changed significantly since the 1920s and it comprises the preparation and purification of the raw materials chlorine and carbon monoxide, the metering and mixing of these materials, the reaction of the mixed gases over activated charcoal, and the condensation and purification of the phosgene product.

The process is normally operated on a continuous basis, employing a high degree of automation. Owing to the toxicity of phosgene, extensive safety measures constitute an integral part of the plant design. The reaction is rapid and nearly quantitative with respect to both reagents. In large scale plants, phosgene is produced at steady state operation, and the product requires downstream storage. The plants are provided with a safety absorption system, whereby any surplus phosgene is absorbed and destroyed with a circulating caustic solution.

For small and medium scale users, e.g. below 1 ton per hour, the production of downstream phosgene products, such as chemical intermediates, biocides and pharmaceutical intermediates, is often done either in production campaigns or with large turndown ratios required, as all the phosgene produced needs to be consumed immediately because storage is too dangerous and for this reason strictly regulated. Therefore, typical phosgene plants with a production capacity below 1 ton per hour can accommodate to a turndown ratio down to 30% and even down to 10% if a slightly lower phosgene quality can be accepted.

A number of patents and patent applications describe the preparation of phosgene by the above reaction. For instance, DE 19 916 856 A1 describes the preparation of phosgene from CO, $Cl_2$ and a metal halide (Al or Ga chloride) catalyst. In WO 98/28227 A1, a carbon catalyst having an active metal content of $\geq 1000$ ppm is used, and JP 10120410 A2 uses $Cl_2$ and CO containing up to 6 mole percent $H_2$. Yellowing of the phosgene product is prevented by reducing the $H_2$ content in CO. According to U.S. Pat. No. 4,073,806 B, phosgene is prepared from chlorine and carbon monoxide by plural stage catalytic interreaction wherein all of the chlorine requirement and at least some, but less than all of the carbon monoxide requirement is introduced to a first stage reaction zone, with the remaining required carbon monoxide being introduced to downstream reaction zone(s) serially connected to said first stage reaction zone. Finally, US 2013/0072717 describes a reactor for preparing phosgene by gas-phase reaction of CO and $Cl_2$ in the presence of a solid catalyst, said reactor having a bundle of parallel catalyst tubes aligned in the longitudinal direction of the reactor in a complicated design pattern.

The reaction is strongly exothermic; the enthalpy of formation being −107.6 kJ/mole, and therefore the reactor must be cooled. Typically, the reaction is conducted at between 50 and 150° C., because at temperatures above 200° C. phosgene reverts to carbon monoxide and chlorine. Carbon monoxide is used in a small excess to ensure that all the chlorine is reacted and chlorine-free phosgene is obtained. The reaction can be carried out at atmospheric pressure or under superatmospheric pressure, frequently at from 2 to 3 bar, so that the phosgene can be condensed by means of cooling water. The global production of phosgene is estimated to be around 3 million t/year.

Phosgene is an extremely toxic gas which gained infamy as a poison gas during World War I. So phosgene is listed in schedule 3 of the Chemical Weapons Convention, and it is still being regarded as a viable chemical warfare agent. Phosgene is an insidious poison as the odour may not be noticed and the symptoms may be slow to appear. The odour detection threshold for phosgene is 0.4 ppm, which is four times the TLV (threshold limit value), and therefore producers as well as consumers of phosgene are strongly focused on safety in connection with any process in which phosgene takes part. Two of the security guidelines, which are typically followed, are

- to avoid storage of large amounts of toxic chemicals, which is a very important lesson learned from the disaster in Bhopal, India, in 1984 and
- wherever possible to avoid human handling of containers with strongly poisonous chemicals. Fatal accidents are known to have happened in connection with handling of phosgene containers.

To observe the above guidelines, phosgene is typically produced and used within the same industry plant. In the USA, more than 99% of the phosgene production is used on the site where it was produced.

However, to secure a safe phosgene production, avoidance of storage and handling of phosgene is not sufficient. It is also very important to avoid storage and handling of large amounts of dangerous raw materials for the preparation process. In this connection especially chlorine and carbon monoxide constitute a severe health risk.

Chlorine constitutes a health risk when present in concentrations around 1 ppm. More specifically, the threshold limit value (TLV) as a short-term exposure limit (STEL) is 1 ppm, and on an 8-hour time weighted average (TWA) basis it is 0.5 ppm. In comparison, phosgene constitutes a health risk when present in concentrations of one tenth of those of chlorine, i.e. 0.1 ppm on TWA basis. In connection with phosgene production chlorine will typically be produced at the same site. This can for example be carried out electrolytically from salt (NaCl) and water in a process that can be used for both large and small volumes of chlorine:

$$2NaCl + 2H_2O \rightarrow Cl_2 + H_2 + 2\,NaOH \quad (2)$$

Instead of NaCl, potassium chloride (KCl) can be used:

$$2KCl + 2H_2O \rightarrow Cl_2 + H_2 + 2\,KOH \quad (3)$$

As regards carbon monoxide, this compound presents a health risk when present in concentrations below 100 ppm, the TLVs being 100 ppm on STEL basis and 25 ppm on TWA basis, and in larger plants (>1 t/hour) it is often produced on the same site where the phosgene is produced. In this case, carbon monoxide can for example be produced either by cracking of methanol:

$$CH_3OH \rightarrow 2H_2 + CO \quad (4)$$

or by reforming of natural gas:

$$CH_4 + H_2O \rightarrow 3H_2 + CO \quad (5)$$

In both situations $H_2$ and CO must be separated. This process is a very costly procedure when carried out in small scale and therefore it is unsuited for smaller CO volumes. In small phosgene plants, CO will typically be delivered in tube trailers, often being transported hundreds of kilometers from central CO production units. CO tube trailers have to be exchanged frequently, often several times a day, which engenders a very substantial risk to the personnel in connection with phosgene production. Thus, regarding smaller phosgene production plants, the transportation, handling and storage of CO constitute a serious safety risk, both on the production site and in connection with the regular transportation of large volumes of CO. For small phosgene plants in remote locations, the availability of CO tube trailers is also an issue. In some cases, when CO delivery is not available, the plants have to use other methods to generate CO, such as sub-stoichiometric burning of indigenous carbon, which however is a much less efficient and much more polluting method. Furthermore, trace amounts of $O_2$ may be available in the CO gas produced in this manner. This is undesirable, as $O_2$ will combine with the carbon catalyst to form $CO_2$, thereby consuming the catalyst.

DETAILED DESCRIPTION OF THE INVENTION

Figure 1:
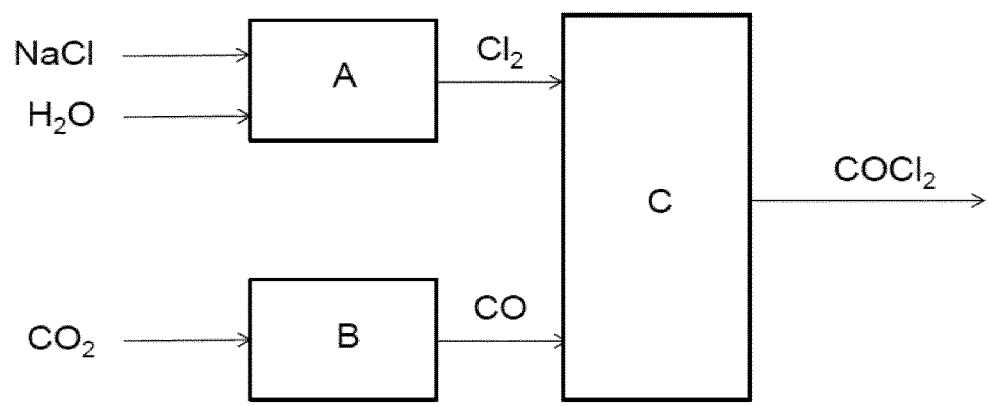
FIG. 1 shows the process of the present invention for the safe production of phosgene.

The present invention thus relates to a novel concept for the production of phosgene, which is safe also when carried out in smaller plants. In the present context, a smaller plant is a plant producing less than 10 tons of phosgene per hour, preferably less than 1 ton of phosgene per hour. An example of this novel production concept is shown in FIG. 1, where the chlorine is produced electrolytically from salt (NaCl) and water in the reactor A according to equation (2) above. Carbon dioxide ($CO_2$) which, unlike CO, is a relatively harmless gas, is converted locally to carbon monoxide in the reactor B according to the reaction:

$$2CO_2 \rightarrow 2CO + O_2 \quad (6)$$

Then the phosgene synthesis is carried out in the reactor C by reacting CO with $Cl_2$ according to equation (1) above.

This novel concept for the production of phosgene is based on using primary raw materials for which escape concentrations above 1000 ppm or even above 10000 ppm or 10% will not result in any health risk.

The carbon dioxide, which is necessary for producing the requisite carbon monoxide, can be produced locally, e.g. from natural gas or various other hydrocarbons by reforming as mentioned above in combination with the water gas shift reaction. Carbon monoxide can also be captured from fermentation of effluent gas, from power plants or engine flue gas, removed from synthesis gas or captured from natural underground $CO_2$ sources.

Well established technologies are available for this purpose and are typically based on various scrubbing technologies, where the $CO_2$ is captured in liquid phase containing for example an amine and subsequently released to the atmosphere or utilized in various processes. It may also be produced from carbon dioxide contained in atmospheric air.

For small to medium scale carbon monoxide production the $CO_2$ is typically captured at a source such as those mentioned above, purified to meet technical or food grade quality and then transported on trucks in liquid form. The truck delivers the $CO_2$ to a local storage tank where the $CO_2$ is stored in liquid form. The tank unit is equipped with an evaporator, and the $CO_2$ is delivered to the carbon monoxide generating plant from the storage tank.

Figure 2:
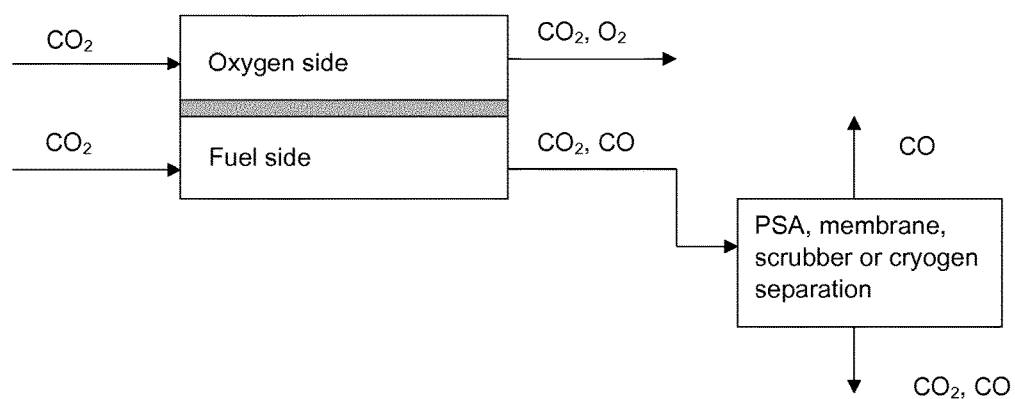
FIG. 2 shows the conversion of $CO_2$ to CO being carried out electrolytically in an SOEC cell stack.

As mentioned above, the conversion of $CO_2$ to CO is preferably carried out electrolytically in an SOEC stack system as shown in FIG. 2:

Carbon dioxide is fed to the fuel side of an SOEC system with an applied current to convert $CO_2$ to CO and transport the oxygen surplus to the oxygen side of the SOEC system. Air, nitrogen or $CO_2$ may be used to flush the oxygen side. Flushing the oxygen side of the SOEC system has two advantages:

reducing the oxygen concentration and related corrosive effects, and providing means for feeding energy into the SOEC system, thereby operating it endothermically.

The product stream from the SOEC system contains mixed CO and $CO_2$. This can be fed directly to the phosgene production, or the CO concentration can be increased in a separation process, such as pressure swing adsorption (PSA), temperature swing adsorption (TSA), membrane separation, cryogenic separation or liquid scrubber technology, e.g. wash with N-methyl diethanolamine (MDEA).

Two important advantages of using an SOEC system to provide CO in relation to phosgene production are that:

The oxygen by-product passes a membrane and hence there will be no oxygen in the CO product stream.

Remaining contents of $CO_2$ in the product stream are practically inert in the phosgene synthesis process and will not lead to the production of undesired by-products in the phosgene synthesis process.

The electrolysis process in the SOEC requires an operating temperature between 650 and 850° C. Depending on the specific operating conditions, the stack configuration and the integrity of the stack, the overall operation can consume heat (i.e. be endothermic), it can be thermoneutral or it can generate heat (i.e. be exothermic). Any operation carried out at such high temperatures also leads to a significant heat loss. Therefore it will typically require external heating to reach and maintain the desired operating temperature.

By producing CO locally from carbon dioxide, it becomes possible to produce phosgene without storage of larger amounts of poisonous chemicals being necessary, without transportation of poisonous chemicals into or away from the phosgene plant, and without the need for continuous exchange of containers or tanks with poisonous chemicals.

Producing CO locally from carbon dioxide has also some key advantages compared to CO production from natural gas reforming or methanol cracking. It is very important that the CO feedstock for phosgene production is free of methane, as any methane present will form the detrimental impurity $CCl_4$ (tetrachloromethane). This impurity is notoriously difficult to avoid and remove, and it will cause an optical deterioration of the finished product, especially polycarbonate products. The CO obtained by local production from $CO_2$ will be free of methane, as the commercially available $CO_2$ feedstock does not contain methane and no methane can be formed during the conversion. It is also very important to secure that no $H_2$ or $H_2O$ is present in the feedstock, as this will lead to formation of HCl causing corrosion problems. CO produced by either natural gas reforming or methanol cracking will contain these impurities, whereas locally produced CO from $CO_2$ avoids these impurities, whereby the corrosion risk decreases and the process safety is increased. The product quality typically required is $CCl_4 < 20\text{-}80$ ppm. Minimum requirements for CO feedstock are $CH_4 < 0.1$ vol % and $H_2 < 0.5$ vol %, although they can be stricter depending on the actual product quality requirement. The limitation with respect to oxygen is more of an operations issue as any oxygen in the CO feed to the phosgene reactor. Any oxygen in the CO feed oxidises the activated carbon catalyst situated in the phosgene reactor, thus consuming the phosgene catalyst and forming $CO_2$.

To avoid $CH_4$ and $H_2$ in the CO product gas from an SOEC unit it is important to feed the SOEC unit with a sufficiently pure $CO_2$ feedstock. It is particularly important to avoid $H_2$ and $H_2O$ in the $CO_2$ fed to the SOEC, as $H_2O$ will be converted into $H_2$ which in turn may combine with the $CO_2$ to form $CH_4$. Consequently, the $H_2$ and $H_2O$ contents of the feedstock should both be well below 0.5%. This requirement can for example be fulfilled with "food grade $CO_2$" as defined in EIGA (European Industrial Gases Association) standard 70/08/E which sets very low limits for $CO_2$ with respect to the contents of moisture (water), ammonia, oxygen, $NO_x$, volatile hydrocarbons, acetaldehyde, benzene, carbon monoxide, methanol, hydrogen cyanide and total sulfur.

One special feature of the SOEC carbon monoxide generator is that very low turndown ratios can be accommodated, so that the CO production in each case can be matched to the required raw material for the phosgene production. Especially small and medium-scale producers require high turndown ratios down to 10%. The SOEC plant can accommodate this, and even in a way that preserves the stack lifetime in an optimal way. Turndown is accomplished by operating only a subset of the stacks, thereby preserving the lifetime of stacks which are not in operation.

In addition it will be possible to exploit by-products from the SOEC system in the production of chlorine and vice versa, i.e. exploit by-products from the chlorine production in the SOEC system, viz.:

Chlorine can be obtained from HCl and oxygen:

$$4HCl + O_2 \rightarrow 2Cl_2 + 2 H_2O \quad (7)$$

where the oxygen from the SOEC system may be used, and

SOEC stacks may also be used in reverse mode as fuel cell stacks. Whenever full capacity on the CO plant is not needed, it is thus possible to use part of the SOEC unit to make electrical energy from the hydrogen produced in the chlorine plant.

The invention claimed is:

1. A process for the production of phosgene ($COCl_2$) from carbon monoxide and chlorine using a catalyst according to the reaction scheme $$CO(g) + Cl_2(g) \rightarrow COCl_2(g) \quad (1)$$

wherein the CO is produced electrolytically on site from $CO_2$ in a solid oxide electrolysis cell (SOEC) stack system; and wherein the concentration of the CO is increased through a separation process prior to feeding to the production of phosgene.

2. Process according to claim 1, wherein the SOEC stack system producing CO is accommodated to turndown ratios below 30%.

3. Process according to claim 1, wherein oxygen from the SOEC stack system is used wholly or in part for the production of chlorine.

4. Process according to claim 1, wherein part of the SOEC unit is used to make electrical energy from the hydrogen produced in a chlorine plant when full capacity on the CO production is not needed.

5. Process according to claim 1, wherein the SOEC stack system producing CO is accommodated to turndown ratios below 10%.

* * * * *